US007126875B2

(12) United States Patent
Baskerville et al.

(10) Patent No.: US 7,126,875 B2
(45) Date of Patent: Oct. 24, 2006

(54) UNDERWATER ENERGY DAMPENING DEVICE

(75) Inventors: Andrew J. Baskerville, Concord, CA (US); David D. Ambuehl, Brentwood, CA (US)

(73) Assignee: State of California, Department of Transportation, Sacramento, CA (US)

( * ) Notice: Subject to any disclaimer, the term of this patent is extended or adjusted under 35 U.S.C. 154(b) by 0 days.

(21) Appl. No.: 10/690,419

(22) Filed: Oct. 20, 2003

(65) Prior Publication Data

US 2005/0083783 A1 Apr. 21, 2005

(51) Int. Cl.
*G01V 1/387* (2006.01)

(52) U.S. Cl. .................................................... 367/24

(58) Field of Classification Search .................. 367/24; 181/110, 112

See application file for complete search history.

(56) References Cited

U.S. PATENT DOCUMENTS 1,348,828 A * 8/1920 Fessenden .................. 181/175
3,177,466 A 4/1965 Arnoldi
3,212,602 A 10/1965 Jones et al.
3,713,540 A 1/1973 Davidson et al.
3,896,898 A 7/1975 Kirby et al.
4,320,989 A 3/1982 Mamo
4,425,240 A 1/1984 Johnson
4,625,302 A 11/1986 Clark
4,903,793 A 2/1990 Firey
5,253,603 A 10/1993 Mascolo
5,513,149 A 4/1996 Salmi et al.
5,959,938 A 9/1999 Behrens
5,999,491 A 12/1999 Harvey et al.
6,222,794 B1 4/2001 Woodall et al.
6,567,341 B1 5/2003 Dreyer et al.
6,571,906 B1 6/2003 Jones
6,606,278 B1 * 8/2003 Lee et al. ..................... 367/24
2002/0080681 A1 6/2002 Dreyer et al.
2003/0034197 A1 2/2003 Jones

* cited by examiner

*Primary Examiner*—Ian J. Lobo
(74) *Attorney, Agent, or Firm*—Heisler & Associates

(57) ABSTRACT

An underwater energy dampening device is disclosed. This device includes a plurality of vertically-spaced bubble producing units. With bubbles produced at various depths, the present invention can effectively attenuate sound and other energy from underwater construction projects in high current or deep water areas.

16 Claims, 9 Drawing Sheets

Fig. 14
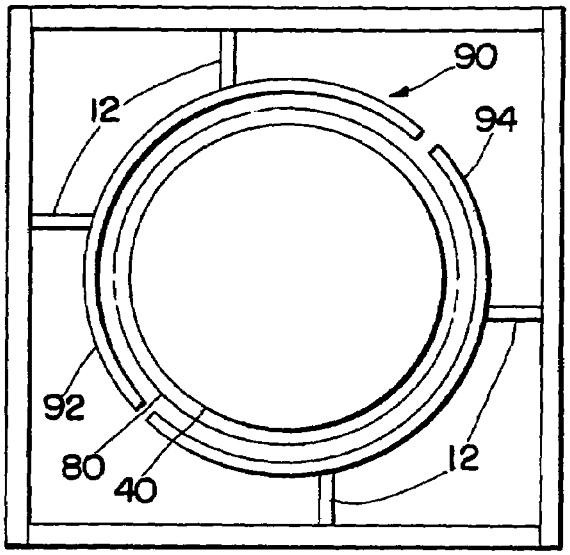
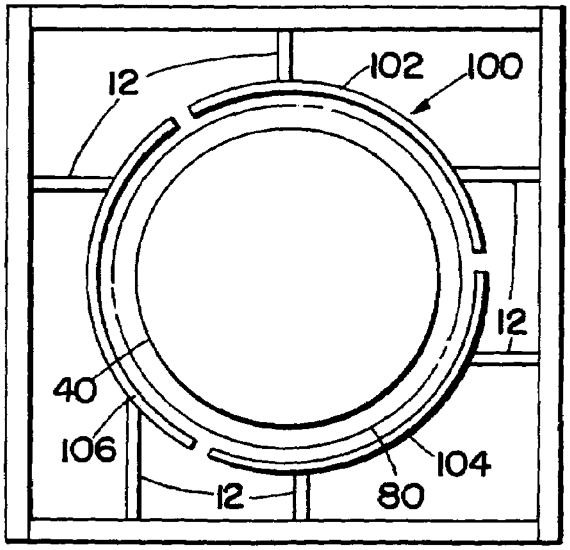
Fig. 15
Fig. 16
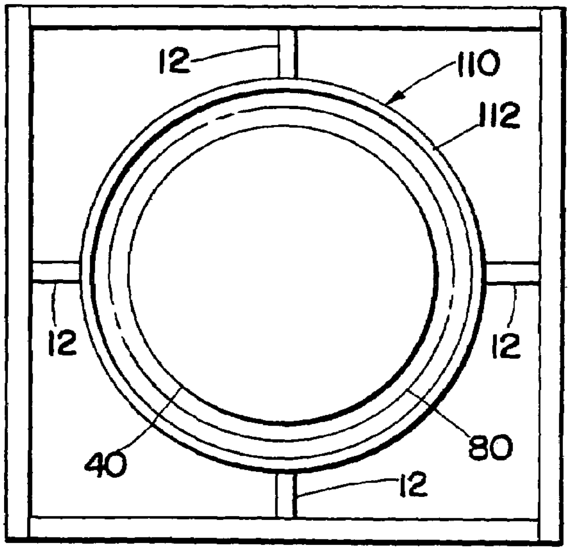

UNDERWATER ENERGY DAMPENING DEVICE

BACKGROUND OF THE INVENTION

1. Field of the Invention

This invention relates to devices and methods for attenuating energy that is transmitted underwater.

2. General Background

Many underwater engineering projects generate significant amounts of sound and other energy. This energy can have adverse consequences on marine ecology. For instance, the energy generated by a pile driving hammer can be great enough to kill fish that swim nearby. Especially when such noisy underwater projects are undertaken in environmentally sensitive areas, these ecological consequences are unacceptable.

A number of techniques have been developed to mitigate the adverse biological consequences of underwater construction. The first technique is to stage the project so that noisy phases occur only at times when the biological consequences are minimal. For instance, if the project is in a waterway traveled by anadromous or catadromous fish, noisy phases can be postponed when the fish are migrating. However, this technique is far from ideal, both because it is wasteful to allow labor and equipment to sit idle waiting for fish to migrate, and because most waterways have a residual fish population at all times.

The second technique is to erect a cofferdam around the project. The cofferdam can be constructed using traditional methods such as sheet piling, or by less traditional methods. For instance, an oversized casing tube can be fitted over a pile casing that is being driven, and then the water can be evacuated from the area between the casings, either partially by injecting air bubbles or fully by dewatering the annular space. The air within the casing or other cofferdam does attenuate the energy from the construction project, but this technique is quite expensive. Indeed, for some underwater projects, it is cost prohibitive to establish a persistent envelope of air around the work area.

A third technique is to enshroud the underwater construction area with a stream of bubbles. Like a cofferdam, this technique uses air to attenuate the energy, but unlike a cofferdam very little structure is needed. Indeed, this technique only requires bubble-producing units to be placed around and at the bottom of the construction project. The bubbles then travel from the bubble-producing units to the surface, blanketing the project in sound-dampening air.

While elegant, this technique is ineffective in areas of deep water or strong currents. In these circumstances, the bubbles disperse too far laterally while traveling upward, and cannot completely envelop the project. To contain the bubbles as they ascend, a skirt or blanket of flexible material can be placed around the work area. However, this technique can also be expensive, and is not particularly robust, since the flexible material can be torn or damaged. Also, the flexible material acts like a sail, and therefore this system is not appropriate for areas of high current. A substantial support frame would also be required to implement this system.

Thus, there is a need for a system that can robustly and inexpensively create a curtain of bubbles around underwater construction sites, even in areas of deep water or strong current.

SUMMARY OF THE INVENTION

The present invention is an underwater energy dampening device that can be used to envelop an underwater construction area in a curtain of bubbles. It comprises a plurality of vertically spaced bubble producing units.

BRIEF DESCRIPTION OF THE DRAWINGS

FIG. 14 is a top view of an alternative bubble producing unit configuration according to an embodiment of the present invention.

FIG. 15 is a top view of another alternative bubble producing unit configuration according to an embodiment of the present invention.

FIG. 16 is a top view of another alternative bubble producing unit configuration according to an embodiment of the present invention.

DETAILED DESCRIPTION

The present invention is an underwater energy dampening device 10 comprising a series of vertically spaced bubble producing units. In one embodiment, the invention comprises a (i) spine 12, (ii) a series of vertically spaced frames 18 attached to the spine 12, (iii) a series of tubes 22 on the frames 18, and (iv) air supply tubing and hardware.

Figure 1:
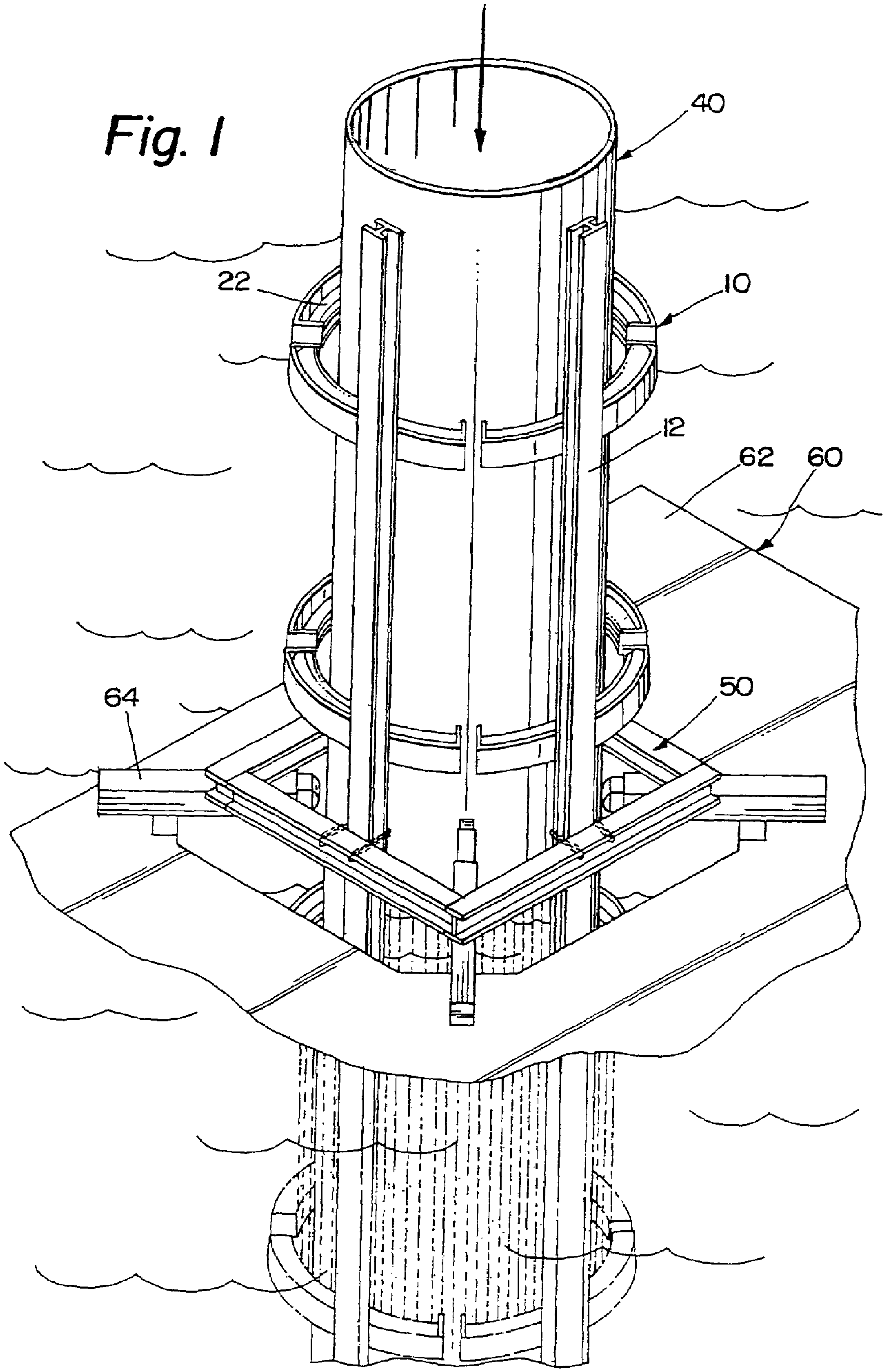
FIG. 1 is an environmental perspective view of an underwater energy dampening device according to an embodiment of the present invention, as deployed for use in a pile driving operation.
Figure 2:
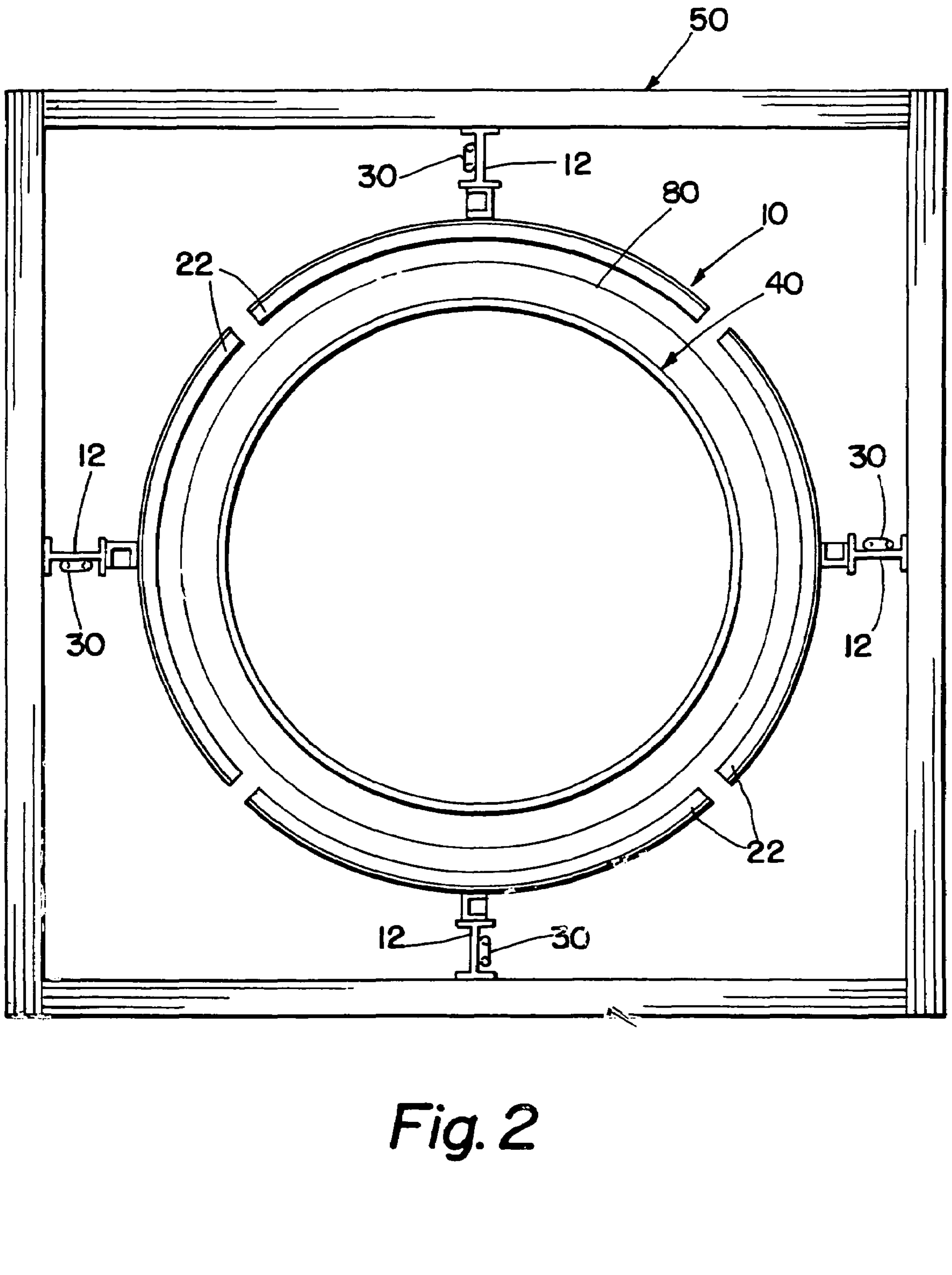
FIG. 2 is a top view of an underwater energy dampening device according to an embodiment of the present invention, as deployed for use in a pile driving operation.
Figure 3:
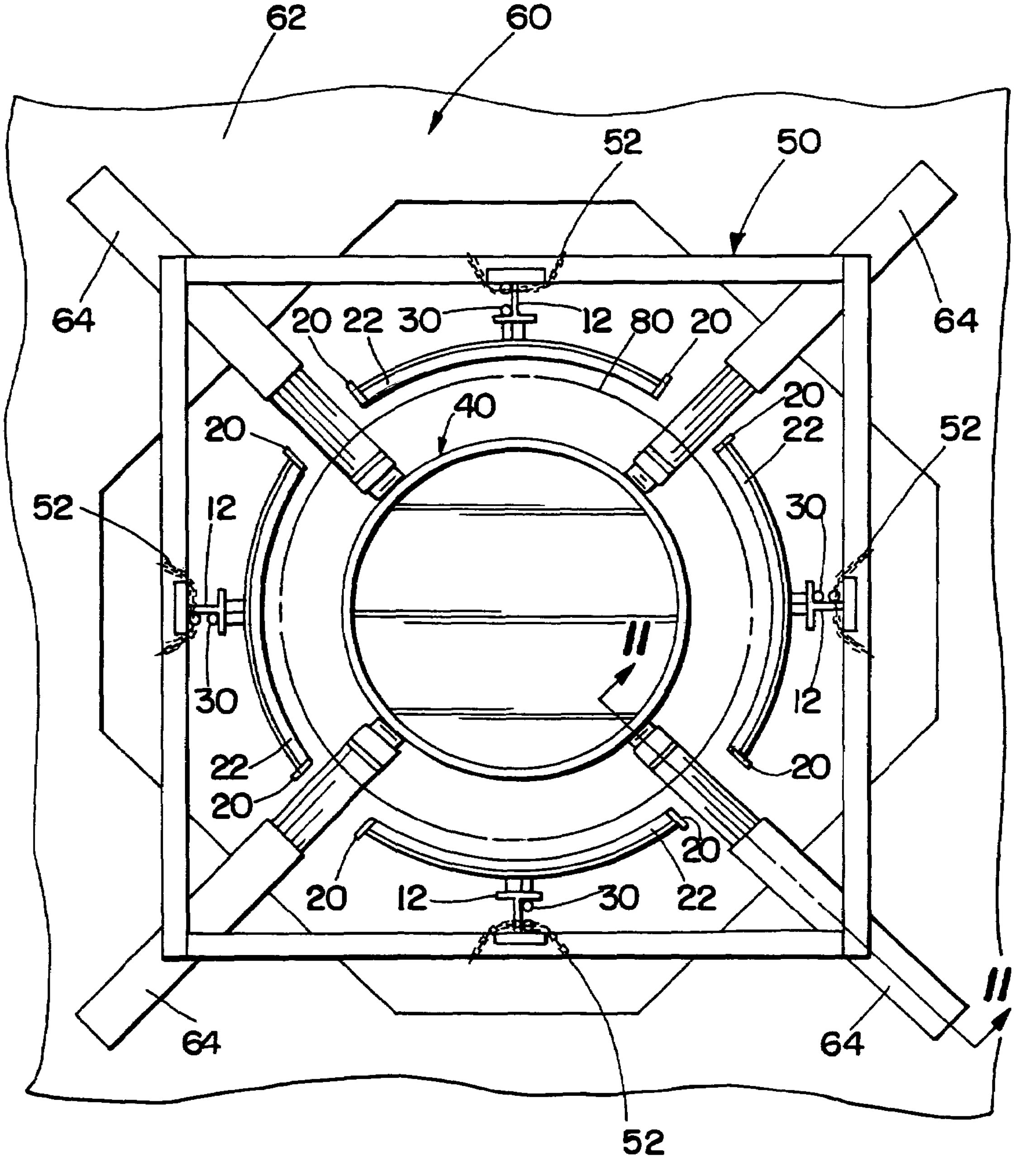
FIG. 3 is an environmental top view of an underwater energy dampening device according to an embodiment of the present invention, as deployed for use in a pile driving operation.
Figure 4:
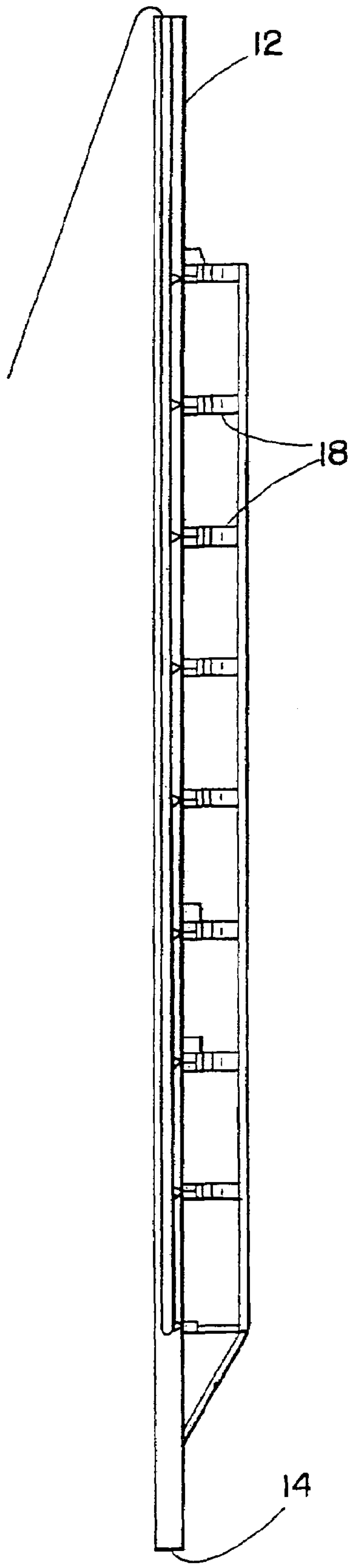
FIG. 4 is a side view of an underwater energy dampening device according to an embodiment of the present invention.
Figure 5:
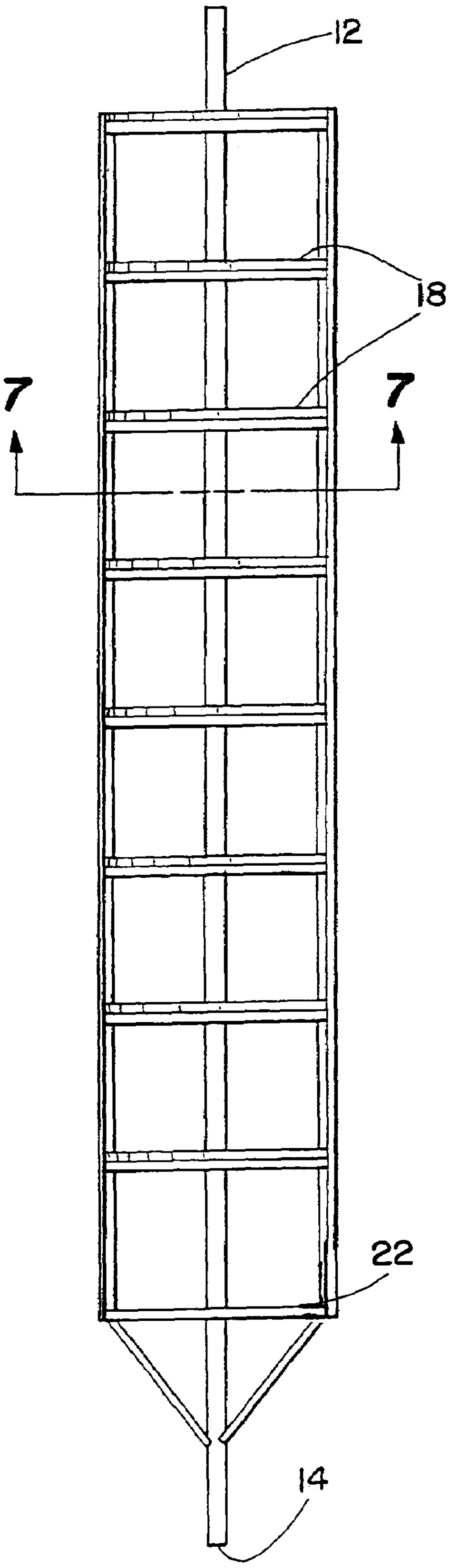
FIG. 5 is a front view of an underwater energy dampening device according to an embodiment of the present invention.

As shown best in FIGS. 1, 4, and 5, the spine 12 comprises a beam, typically made of steel. Other potential materials include rust resistant materials such as stainless steel. The spine 12 should have a length adequate for the water depth in the area of the underwater project. When installed, its bottom end 14 may be planted into the bed of the waterway, so that the bottom frame 18 is as close to the mudline as practical. See FIG. 6.

A series of vertically-spaced frames 18 are attached to the spine 12. See FIGS. 1, 4, 5, and 6. These frames 18 may be semi-circular, and their purpose is to provide support for the bubble-producing tubes 22.

Figure 9:
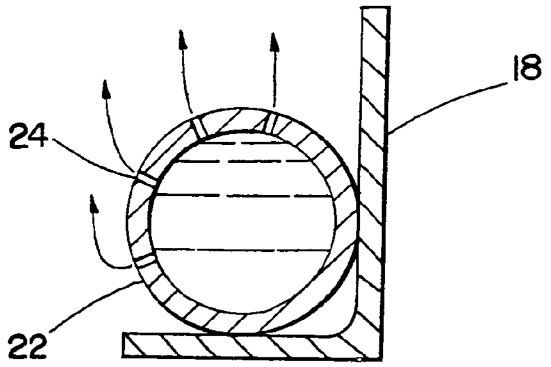
FIG. 9 is a cross-sectional view of a bubble producing tube and frame according to an embodiment of the patent invention, taken along line 9—9 of FIG. 8.

The bubble-producing tubes 22 sit within the frames 18. See FIGS. 1 and 9. These tubes will typically be made of a rust-resistant material like high density polyethylene (HDPE) or stainless steel. The tubes 22 have end plates 20 to seal the ends of the tubes.

Figure 8:
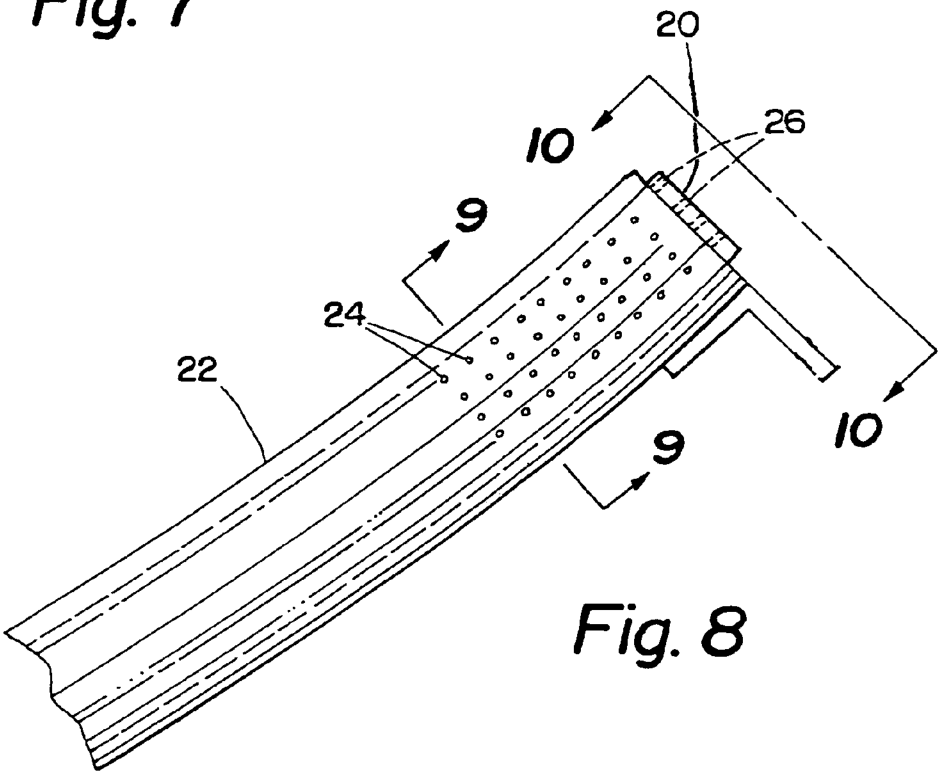
FIG. 8 is a close-up of the circled area on FIG. 7.
Figure 10:
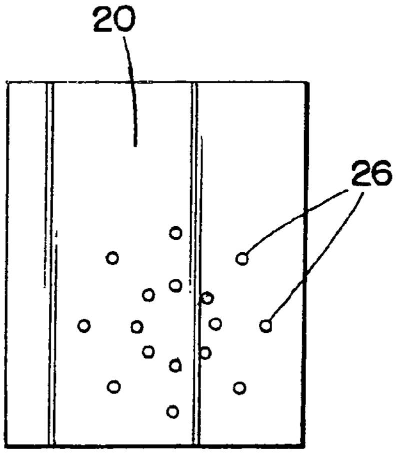
FIG. 10 is a close-up end view of a bubble producing tube according to an embodiment of the patent invention, taken along line 10—10 of FIG. 8.
Figure 12:
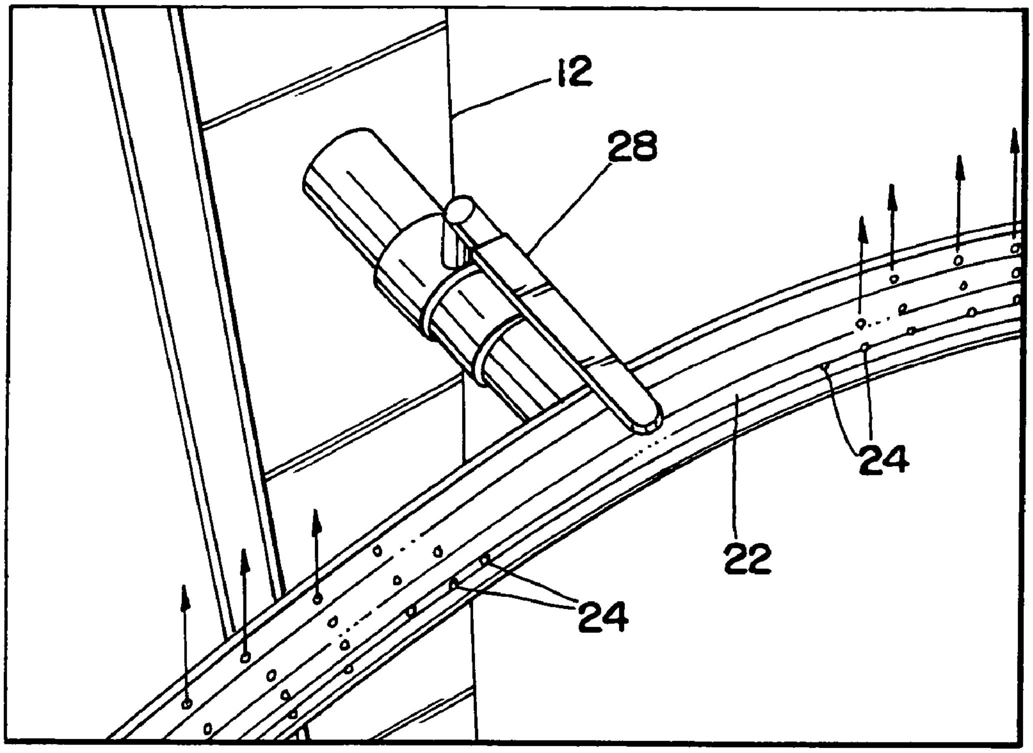
FIG. 12 is a top perspective close-up view of a valve that regulates the supply of compressed air to the bubble producing unit, according to an embodiment of the present invention.

The bubble-producing tubes 22 have a plurality of openings 24 on their top sides for release of bubbles. See FIGS. 8, 9, and 12. The tubes also may have a plurality of openings 26 on their end plates 20 for lateral dispersal of bubbles. See FIG. 10. These end openings 26 are useful when there is a gap between one device and the next, as in the embodiments shown in FIGS. 1, 2, 3, 14, and 15. By releasing bubbles at the end of each tube through the end plate 20, the curtain of bubbles will be continuous, notwithstanding a gap between the tubes 22.

The bubble-producing tubes 22 and frames 18 are just one example of a bubble producing unit. For purposes of this patent, a bubble producing unit is any device or system that delivers bubbles. Such a unit a can be a tube, ring, hose, bubbler, chemical gas generation system, or any other device that can create bubbles.

The bubble-producing tubes 22 or other bubble producing units are vertically spaced, so that bubbles are being generated at various depths. See FIGS. 1, 4–6. Thus, in one embodiment, the bubble-producing tubes 22 are spaced every 3 to 5 meters along the spine 12. See FIGS. 1, 4, and 5. This distance may vary depending on the conditions within which the invention is operating.

Figure 13:
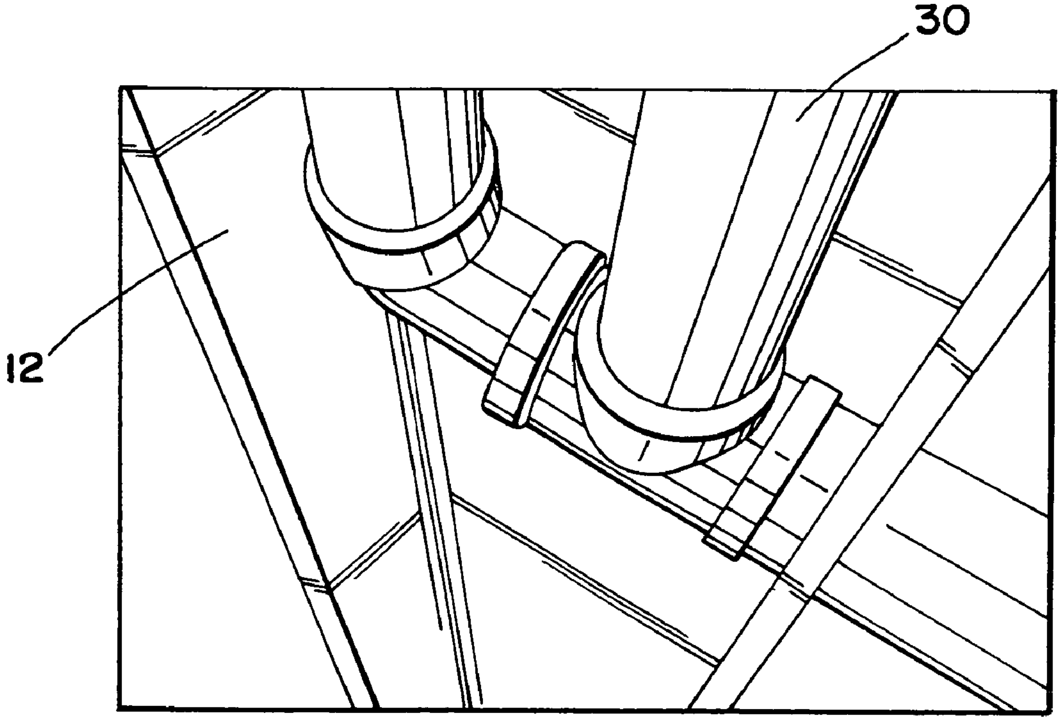
FIG. 13 is a top perspective close-up view of an air supply line at the bottom of a device according to an embodiment of the present invention, as the line branches off to provide air to the bottom bubble-producing tube.

Air supply tubing and hardware is used to provide and regulate airflow to the bubble-producing tubes 22. An air supply line 30 supplies air to each of the tubes 22. See FIG. 2, 3, and 13. Because greater air pressure is needed at the bottom, the air supply line 30 first travels all the way down the spine 12 to the bottom of the device, and then starts distributing air to each bubble-producing unit. See FIGS. 6 and 13. This air can be generated by a compressor, pressurized gas, or by other gas generation means such as a chemical reaction. Other gases besides air can be used. The pressure to be generated depends on the depth to which the air is delivered.

Figure 6:
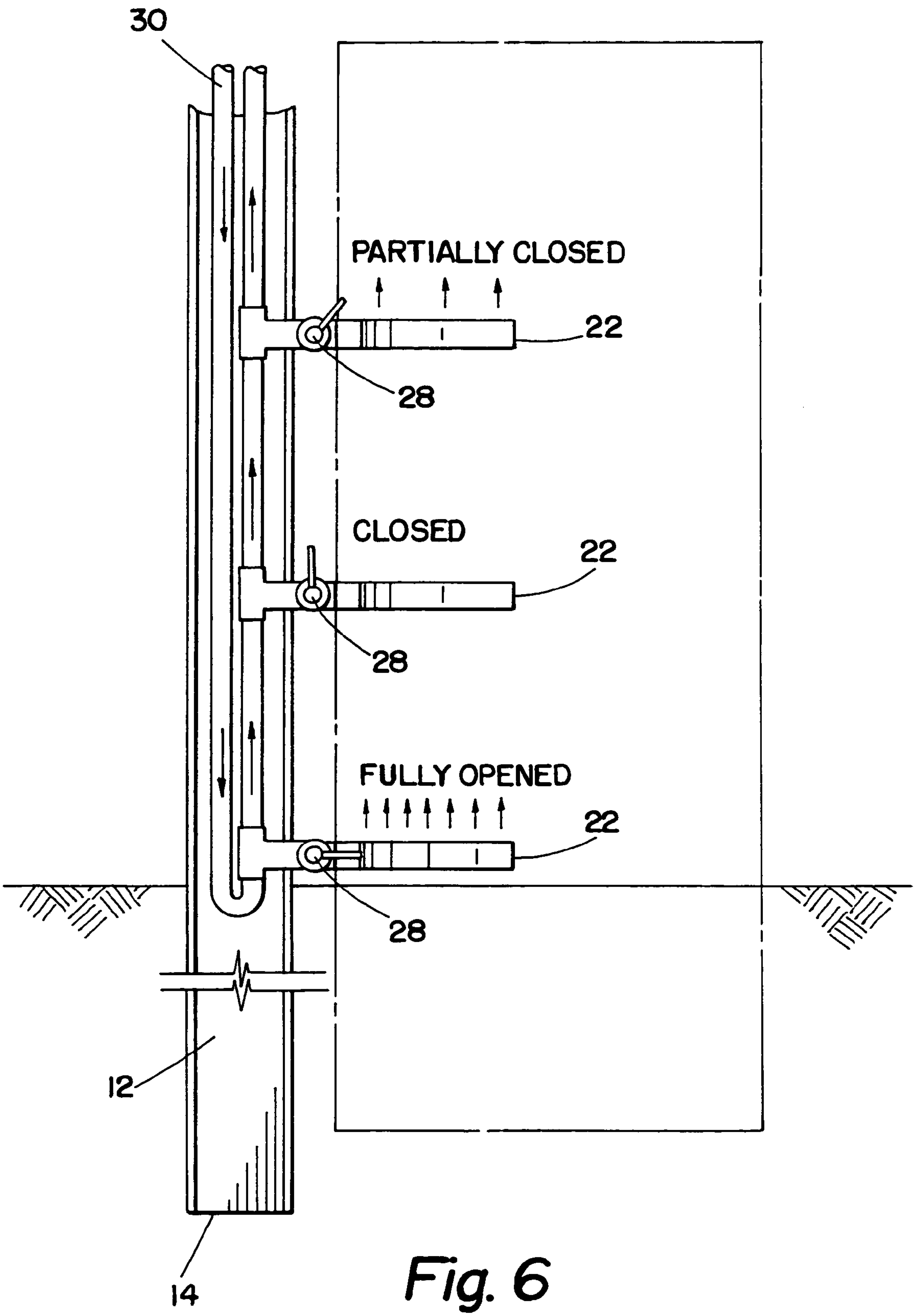
FIG. 6 is is a side view of an underwater energy dampening device according to an embodiment of the present invention, showing the air flow patterns and valve positions within the device.
Figure 7:
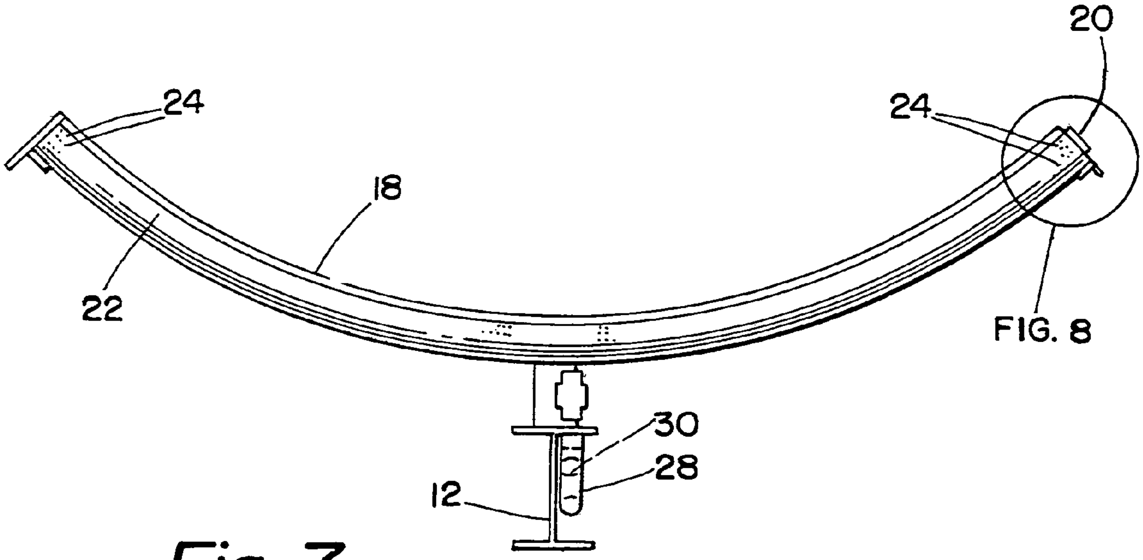
FIG. 7 is a sectional view of a bubble producing tube and frame according to an embodiment of the patent invention, taken along line 7—7 of FIG. 5.

Each tube 22 has a valve 28 to control the flow of air. See FIGS. 2, 3, 6, and 12. As shown in FIG. 6, the position of the valves can be adjusted to regulate the air flow. Depending on the water current and other conditions within which the device is operated, only certain tubes 22 may be operated at any time. For instance, in certain circumstances, only every other tube needs to be operational at any given time. Also, because greater pressure is needed at lower depths, the position of the valves may vary incrementally from bottom to top. Pressure gauges (not shown) may be installed for each valve, so that operators can more precisely determine the proper position for each valve.

Although manual valves are shown, the valves may also be pneumatically or hydraulically controlled. Additionally, a more automated version of the present invention could be created, in which acoustic sensors provide data to a processing unit, which in turn control air flow or pressure so that a sufficient but not superfluous quantity of bubbles is produced.

With the basic structure of the invention now in mind, a particular operational embodiment can be described. In this embodiment, the invention is used in a pile driving operation.

In this operation, the pile casing 40 is driven deep into the bed of the waterway. A pile driving hammer (not shown) is used, and this hammer has a footprint 80 extending beyond the perimeter of the casing. Thus, the topmost portion of the energy dampening device cannot be inside the hammer's footprint 80. See FIGS. 1, 2, 3, 14, 15, 16. However, the bottom portion of the device can be very close to the casing, and the device can be angled slightly outward so that it is farther away from the casing at the top.

Figure 11:
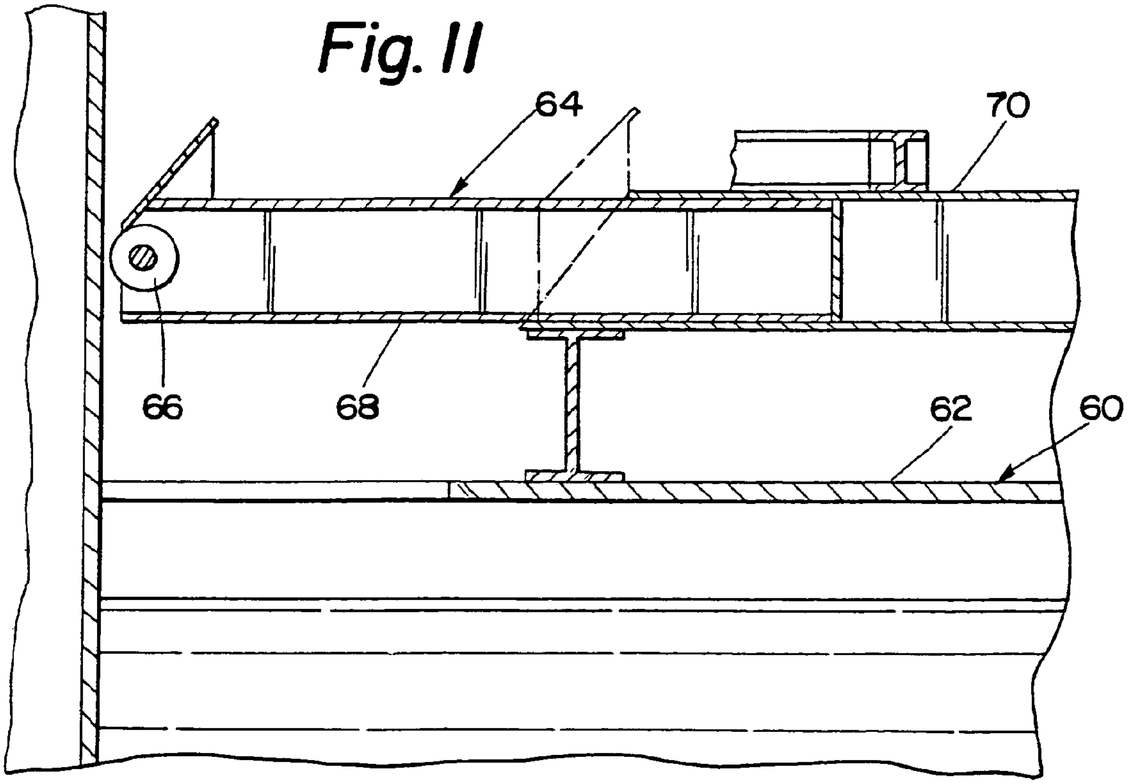
FIG. 11 is a cross-sectional view taken along line 11—11 of FIG. 3.

Typically, a template or deck structure 60 with a deck floor 62 is erected to support the pile driving operations. See FIGS. 1, 2, and 3. The energy dampening device must be installed within the framework provided by the deck structure 60. This framework may include telescoping struts 64 to secure the casing, and these struts may comprise a wheel 66 on the end of an inner beam 68, which in turn sits inside of an outer beam 70. See FIGS. 1, 3, and 11.

To install an energy dampening device 10 within such a deck structure 60, a dampening device frame 50 is placed atop the structure 60, over the opening into which the pile casing 40 is being driven. See FIGS. 1, 2, 3, 14, 15, and 16. The device 10 is then lifted by a crane and then stabbed between the pile casing 40 and the frame 50 into the bed of the waterway. Depending on conditions, the weight of the device 10 may be sufficient to firmly implant the device into the mud. The device should be implanted so that the lowermost bubble producing unit is just above the mudline. To secure or cinch the device 10 to the frame 50, coupling means 52 such as a chain with a ratcheting device can be used. See FIGS. 1 and 3.

To completely surround the pile casing, it may be necessary to use more than one energy dampening device 10. Thus, in the embodiment depicted in FIGS. 1–13, four devices 10 are used to surround the pile casing 40. However, fewer or more devices 10 may be appropriate, depending on the particular conditions, including the geometry of the deck structure 60. Thus, FIG. 14 shows an alternative embodiment 90 of the device in which two bubble-producing units 92, 94 surround the pile casing 40, FIG. 15 shows an embodiment 100 three bubble-producing units 102, 104, and 106 surrounding a pile casing 40, and FIG. 16 shows a third embodiment 110 with unitary unit 112 surrounding the pile casing 40.

Preferably, the device or devices are installed as close to the energy source as possible. For instance, for pile driving operations, it is preferable to surrounding each pile casing with bubbles, rather than the entire pile group. However, except where limited by express claim language, the present patent covers any version of the present invention, including versions in which the device is placed around the periphery of a large work area.

The present invention offers a number of advantages over the prior art. First, the present invention can be inexpensively and effectively used in an area of high current and great depth. Before the present invention, the only effective high current/high depth technique was the use of a cofferdam such as an oversized casing, but this technique is quite expensive and difficult to implement at great depths. Second, the present invention can be modular, with the number, shape, and configuration of the energy dampening devices adjusted based on the particular requirements of the project and the available equipment. Third, the present invention is easier to use than the alternatives, since the amount of needed structure is minimal—all that is needed is an array of vertically spaced bubble-producing units.

One skilled in the art will appreciate that the present invention can be practiced by other than the preferred embodiments, which are presented for purposes of illustration and not of limitation.

We claim:

1. An underwater energy dampening device, comprising:
- a first bubble producing unit and a second bubble producing unit;
- a spine for supporting said first bubble producing unit and said second bubble producing unit;
- wherein said first bubble producing unit comprises:
  - a tube support frame attached to said spine; and
  - a tube with holes, said tube being placed within said frame;
- said second bubble producing unit being vertically spaced from said first bubble producing unit; and
- one or more means for supplying gas to said first bubble producing unit and to said second bubble producing unit.

2. The device according to claim 1, wherein said means for supplying gas to said first bubble producing unit and said second bubble producing unit comprises:
- at least one compressor; and
- tubing attached to said compressor and to said first bubble producing unit and to said second bubble producing unit.

3. The device according to claim 2, additionally comprising a frame for removable attachment to the top of said spine.

4. The device according to claim 3, wherein said first bubble producing unit is vertically spaced from between three and five meters from said second bubble producing unit.

5. The device according to claim 4, additionally comprising a third bubble producing unit, said third bubble producing unit being vertically spaced from said first bubble producing unit and from said second bubble producing unit.

6. The device according to claim 5, additionally comprising a fourth bubble producing unit, said fourth bubble producing unit being vertically spaced from said first bubble producing unit, from said second bubble producing unit, and from said third bubble producing unit.

7. A method for dampening energy that is generated from an underwater energy source, comprising:
- providing at least two devices according to claim 1;
- surrounding said energy source with said devices; and
- producing bubbles through said devices.

8. The method according to claim 7, wherein at least three devices according to claim 1 are provided and used to create bubbles.

9. The method according to claim 8, wherein at least four devices according to claim 1 are provided and used to create bubbles.

10. A stationary underwater energy dampening device, comprising in combination:
- a first tube segment with holes for release of a gas;
- a second tube segment with holes for release of a gas;
- a source of gas coupled to each said tube segment;
- said first tube segment located vertically spaced below said second tube segment;
- each said tube segment adapted to be held stationary; and
- wherein said first tube segment and said second tube segment are separate from each other and are each coupled to a common elongate vertically extending spine.

11. The energy dampening device of claim 10, wherein said first tube segment and said second tube segment are aligned such that bubbles released from holes in said first tube segment travel up to a location of said second tube segment and substantially intersecting with the position of said second tube segment, except when disturbing forces such as water currents influence bubble travel.

12. The energy dampening device of claim 10, wherein a tube support frame is coupled to each said tube segment, said tube support frames adapted to hold adjacent tube segments to said spine.

13. The energy dampening device of claim 12, wherein each said tube support frame is adapted to support one of said tube segments within said tube support frame.

14. The energy dampening device of claim 10, wherein each said tube segment is arcuate extending circumferentially around a cylindrical region in which a sound source can be located with dampening of energy from the sound source by bubbles released from said holes in said tube segments.

15. An underwater energy dampening device, comprising in combination:
- a first hole for release of a gas;
- a second hole for release of a gas;
- a source of gas coupled to each said hole;
- said first hole located vertically spaced below said second hole;
- said first hole and said second hole aligned such that bubbles released from said first hole travel upward to a location of said second hole, except when forces such as water currents influence bubble travel; and
- wherein said first hole is located within a first tube segment and said second hole is located within a second tube segment, said first tube segment and said second tube segment separate from each other and each extending arcuately and circumferentially around a cylindrical region in which a sound source can be located, with dampening of energy emanating from the sound source by bubbles released from said holes in said tube segments.

16. The energy dampening device of claim 15, wherein each said hole is coupled to a common elongate vertically extending spine.

* * * * *